US010693701B2

(12) United States Patent
Fang et al.

(10) Patent No.: US 10,693,701 B2
(45) Date of Patent: Jun. 23, 2020

(54) RECEIVER, A PLURALITY OF TRANSMITTERS, A METHOD OF RECEIVING USER DATA FROM MULTIPLE TRANSMITTERS, AND A METHOD OF TRANSMITTING USER DATA

(71) Applicant: Alcatel Lucent, Boulogne Billancourt (FR)

(72) Inventors: Dong Fang, Blanchardstown (IE); Stepan Kucera, Blanchardstown (IE); Holger Claussen, Blanchardstown (IE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/755,224

(22) PCT Filed: Aug. 15, 2016

(86) PCT No.: PCT/EP2016/069324
§ 371 (c)(1),
(2) Date: Feb. 26, 2018

(87) PCT Pub. No.: WO2017/032625
PCT Pub. Date: Mar. 2, 2017

(65) Prior Publication Data
US 2018/0248739 A1    Aug. 30, 2018

(30) Foreign Application Priority Data

Aug. 26, 2015    (EP) .................................... 15306315

(51) Int. Cl.
*H04L 27/34* (2006.01)
*H04L 1/00* (2006.01)
(Continued)

(52) U.S. Cl.
CPC ..... *H04L 27/3422* (2013.01); *H04B 1/71055* (2013.01); *H04B 7/0854* (2013.01);
(Continued)

(58) Field of Classification Search
CPC ............. H04L 27/3422; H04L 27/3818; H04L 1/0057; H04L 5/0026; H04B 1/71055;
(Continued)

(56) References Cited

U.S. PATENT DOCUMENTS 7,016,440 B1 * 3/2006 Singer .................... H04L 1/005
375/229
10,128,983 B2 * 11/2018 Robert Safavi ....... H04L 1/0067
(Continued)

FOREIGN PATENT DOCUMENTS

| CN | 101164269 | 4/2008 |
| CN | 102916763 | 2/2013 |
| CN | 104780022 | 7/2015 |

OTHER PUBLICATIONS

Low Density Lattice Codes, Naftali Sommer, Senior Member, IEEE, Meir Feder, Fellow, IEEE, and Ofir Shalvi, Member, IEEE (Year: 2007).*
(Continued)

*Primary Examiner* — Hassan A Phillips
*Assistant Examiner* — Mohammed S Chowdhury
(74) *Attorney, Agent, or Firm* — Fay Sharpe LLP

(57) ABSTRACT

A method is provided of receiving user data from multiple transmitters, the user data from each transmitter having been encoded as a Low Density Lattice codeword, and the multiple Low Density Lattice codewords having been transmitted so as to be received as a combined signal at a receiver, the method of receiving comprising the steps of: (i) receiving the signal, (ii) calculating coefficients of linear combinations of the codewords from the multiple transmitters, (iii) calculating a scaling factor to be applied to the signal based on the coefficients, (iv) applying the scaling factor to the signal to provide a linear combination of the codewords, (v) decoding the linear combination of the codewords based on channel state information to obtain an optimal independent (Continued)

linear combination of user data, (vi) repeating steps (ii), (iii) (iv) and (v) to obtain at least as many optimal independent linear combinations as the number of transmitters, and recovering the user data from the optimal independent linear combinations.

15 Claims, 3 Drawing Sheets

(51) Int. Cl.
    *H04J 13/00* (2011.01)
    *H04B 1/7105* (2011.01)
    *H04B 7/08* (2006.01)
    *H04L 27/38* (2006.01)
    *H04L 5/00* (2006.01)

(52) U.S. Cl.
    CPC ...... *H04J 13/0003* (2013.01); *H04J 13/0007* (2013.01); *H04L 1/0057* (2013.01); *H04L 27/3818* (2013.01); *H04L 5/0026* (2013.01)

(58) Field of Classification Search
    CPC .. H04B 7/0854; H04J 13/0003; H04J 13/0007
    USPC ........................................... 370/328
    See application file for complete search history.

(56) References Cited

U.S. PATENT DOCUMENTS

| | | | |
|---|---|---|---|
| 2008/0253478 A1* | 10/2008 | Kim | H04B 7/0617 375/299 |
| 2010/0027408 A1* | 2/2010 | Green | H04J 13/10 370/208 |
| 2011/0274198 A1 | 11/2011 | Cheng | |
| 2013/0064320 A1* | 3/2013 | Nissani (Nissensohn) | H04L 1/0618 375/295 |

OTHER PUBLICATIONS

Shaping Methods for Low-Density Lattice Codes, Naftali Sommer, Meir Feder and Ofir Shalvi; IEEE (Year: 2009).*
H. Nikopour et al., "Sparse code multiple access," 2013 IEEE 24$^{th}$ International Symposium on Personal, Indoor and Mobile Radio Communications: Fundamentals and PHY Track, pp. 332-336, XP0552271113, 2013.
N Sommer et al., "Low-density lattice codes," IEEE Transactions on Information Theory, vol. 54, No. 4, pp. 1561-1585, XP080280916, 2008.
International Search Report for PCT/EP2016/069324 dated Oct. 19, 2016.
Wang, et al.; "Complex Low Density Lattice Codes to Physical Layer Network Coding", IEEE International Conferenc on Communications (ICC) 2015, Jun. 2015, p. 2060-2065.

* cited by examiner

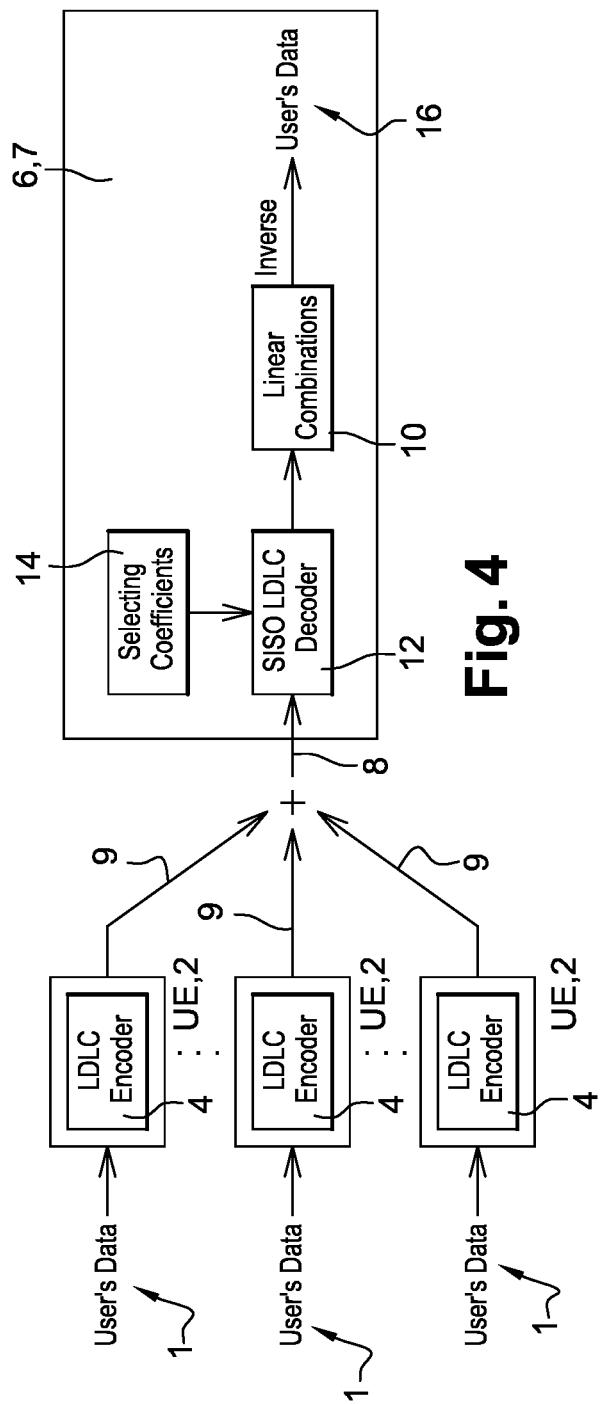
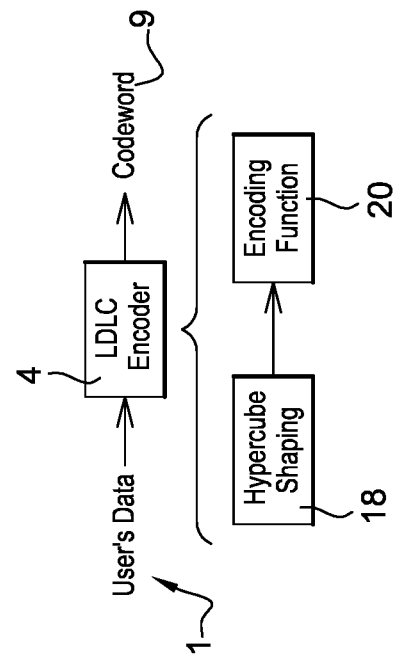
Fig. 4
Fig. 5

RECEIVER, A PLURALITY OF TRANSMITTERS, A METHOD OF RECEIVING USER DATA FROM MULTIPLE TRANSMITTERS, AND A METHOD OF TRANSMITTING USER DATA

FIELD OF THE INVENTION

The present invention relates to telecommunications, in particular to wireless telecommunications.

DESCRIPTION OF THE RELATED ART

There is a drive towards greater capacity beyond what is available in 3G and 4G systems. As shown in FIG. 1, when signal to interference/noise ratio (SINR) is high, there is a substantial gap between the capacity possible if not limited by the modulation scheme used (in other words the Shannon Bound) and the capacities available using the modulations schemes (QPSK, 8PSK, 16QAM) available in 4G networks Fifth generation (5G) wireless networks are now under development with the aim of better quality of service, higher data throughput and lower latency. To this end, Third Generation Partnership Project (3GPP) telecommunications standards bodies are targeting unprecedentedly high capacity densities, for example of up to 25 Gbits/second/square kilometre. In 3GPP there are discussions about 5G radio access technology, in the context of which a radio access technology and physical layer waveform for uplink communications is proposed based on sparse code multiple access (SCMA), see H. Nikopour and H. Baligh, "Sparse code multiple access," in Personal Indoor and Mobile Radio Communications (PIMRC), 2013 IEEE 24th International Symposium on, 2013, pp. 332-336. The known SCMA encoder is shown in FIG. 2.

In this SCMA approach, each user's binary data is mapped onto an n-dimensional real or complex-valued codeword that is then transmitted by using multiple physical resources (for example n symbol periods, n OFDM subcarriers or n antennas). Also, each user uses a distinct codebook (a set of codewords that can be understood as a multidimensional constellation which is derived from a lattice based on a sparse code. Furthermore, joint multiuser detection is used to distinguish individual codewords of different users.

The lattice codebook of this known SCMA scheme is generated from the Cartesian product of several independent QAM constellations.

SUMMARY

The reader is referred to the appended independent claims. Some preferred features are laid out in the dependent claims.

An example of the present invention is a method of receiving user data from multiple transmitters, the user data from each transmitter having been encoded as a Low Density Lattice codeword, and the multiple Low Density Lattice codewords having been transmitted so as to be received as a combined signal at a receiver, the method of receiving comprising the steps of:

(i) receiving the signal,
(ii) calculating coefficients of linear combinations of the codewords from the multiple transmitters,
(iii) calculating a scaling factor to be applied to the signal based on the coefficients,
(iv) applying the scaling factor to the signal to provide a linear combination of the codewords,
(v) decoding the linear combination of the codewords based on channel state information to obtain an optimal independent linear combination of user data,
(vi) repeating steps (ii), (iii) (iv) and (v) to obtain at least as many optimal independent linear combinations as the number of transmitters, and
recovering the user data from the optimal independent linear combinations.

Preferred embodiments provide a multi-user medium access based on low density lattice coding. An approach to multi-user medium access is proposed based on multi-dimensional low density lattice codes, which we call low density lattice multiple access (LDLMA).

Preferred embodiments use a low-density lattice code (LDLC) as a basis for data encoding and medium access, in which a multi-dimensional constellation (referred to as a lattice) derived from the LDLC allows network users to asymptotically approach Shannon capacity.

Preferred embodiments use the same LDLC lattice codebook for encoding the binary data of all network users. Accordingly, the receiver receives a combination of all transmitted codewords. Since all users use the same lattice, the received linear combination of multiple codewords is also an element of the lattice codebook employed. Thus, the receiver only needs to decode linear combinations of users' LDLC codewords rather than separating them as would be required in known joint detection schemes.

In preferred embodiments, a single-input-single-output (SISO) LDLC decoder may perform such decoding by exploiting the posterior probability of linearly combined codewords in an iterative manner, which results in a linear decoding complexity even when the number of users is large.

In preferred embodiments, the individual codewords of distinct network users are detected by estimating the best combination coefficients subject to the knowledge of channel state information and the received signal.

Preferred embodiments provide a 5G access technology which we refer to as LDLMA, in which a multi-dimensional lattice constellation is used for encoding user data. The lattice constellation is constructed from the low-density lattice code (LDLC).

In preferred embodiments LDLMA may be implemented in either or both of uplink and downlink. Especially in the downlink, a SISO decoder with linear complexity is usable which reduces the hardware required in a mobile handset and saves battery energy of the handset.

Some preferred embodiments have the advantages that users use the same lattice codebook to encode their data, the low-density lattice has a superior shaping gain and there is less decoding complexity. For example, as mentioned above the lattice codebook of the known SCMA scheme is generated from the Cartesian product of several independent QAM constellations. In contrast to this the Low-Density Lattice is a natural lattice which does not require any transformation from an existing 2-dimensional lattice such as PSK or QAM. Hence it has a superior shaping gain as compared to the multidimensional lattice constellation employed in the known SCMA approach.

Preferred embodiments have linear decoding complexity. In contrast to the known SCMA scheme, preferred embodiments do not require a base station to distinguish each user's codeword by using joint multiuser detection. Instead, the base station estimates the best linear combination of users' codewords and retrieves individual user data by solving a set of linear equations for the estimated best coefficients. The base station does not need to separate each user's codeword, hence a single-in-single-out (SISO) decoder is sufficient. This significantly reduces the decoding complexity compared with the joint multiuser detection used in the known SCMA approach.

Preferably, the calculation of the scaling factor comprises applying a minimum mean square error (MMSE) criterion to minimise variance of effective noise.

Preferably, the calculation of the coefficients comprises maximising a virtual rate of the linear combination (t) of codewords.

Preferably, the decoding the linear combinations comprises iterative cycles, each cycle comprising calculating a variable node message and calculating a check node message. Preferably, obtaining each optimal independent linear combination of user data comprises, after the final iteration, estimating probability density functions of codeword elements.

Preferably, the linear combination of codewords is itself a valid codeword of the Low Density Lattice.

Preferably the recovering user data from the optimal independent linear combinations comprises taking a pseudo-inverse of a matrix of coefficients of the optimal independent linear combinations.

Preferably the transmitters are user terminals for cellular wireless telecommunications.

Examples of the present invention also relates to corresponding receiver.

An example of the present invention relates to a receiver configured to receive user data from multiple transmitters, the user data from each transmitter having being encoded as a Low Density Lattice codeword, and the multiple Low Density Lattice codewords having been transmitted so as to be received as a combined signal at the receiver, the receiver comprising:

a receiving stage configured to receive the signal;

an iterative processing stage configured to provide at least as many optimal independent linear combinations as the number of transmitters, the iterative processing stage comprising:

a processor configured to calculate coefficients of linear combinations of the codewords from the multiple transmitters, a processor configured to calculate a scaling factor to be applied to the signal based on the coefficients, a processor configured to apply the scaling factor to the signal to provide a linear combination of the codewords, and a decoder configured to estimate an optimal linear combination of user data based on channel state information and the linear combination of the codewords;

and the receiver also comprises a recovery stage configured to recover the user data from the optimal independent linear combinations.

Preferably the receiver is a base station for cellular wireless communications.

Preferably the decoder is a Single-Input Single-Output (SISO) decoder.

Examples of the present invention also relates to a method of transmitting. An example of the present invention relates to a method of transmitting user data as codewords of a Low Density Lattice, wherein each transmitter encodes its user data into a respective codeword for transmission and transmits the codeword on a carrier signal over air; wherein a plurality of the transmitters use a shared Low Density Lattice codebook for the encoding.

Preferably, the transmitters are user terminals for wireless cellular telecommunications.

Preferably the codewords are adapted by hypercube shaping for power control.

Examples of the present invention also relates to a plurality of transmitters. An example of the present invention relates to a plurality of transmitters configured to transmit towards a receiver respective data as codewords of a Low Density Lattice, wherein each transmitter encodes its respective data into a respective codeword for transmission and transmits the codeword via a carrier signal over air; wherein the plurality of the transmitters use a shared Low Density Lattice codebook for the encoding.

BRIEF DESCRIPTION OF THE DRAWINGS

An embodiment of the present invention will now be described by way of example and with reference to the drawings, in which:

FIG. 4 is a diagram illustrating encoding and decoding procedure according to the first embodiment, FIG. 5 is a diagram illustrating in more detail the encoding shown in FIG. 4 including generation of an LDLMA codeword from user data.

DETAILED DESCRIPTION

Figure 1:
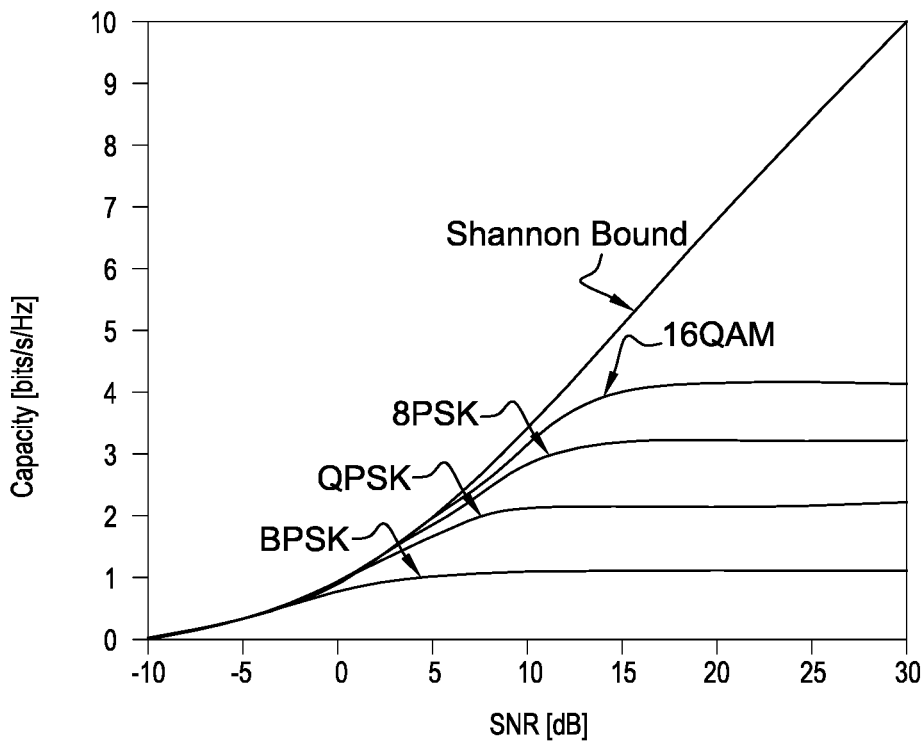
FIG. 1 is a diagram illustrating the capacity of 4G systems as a function of SINR for various modulation schemes, and the Shannon bound.
Figure 2:
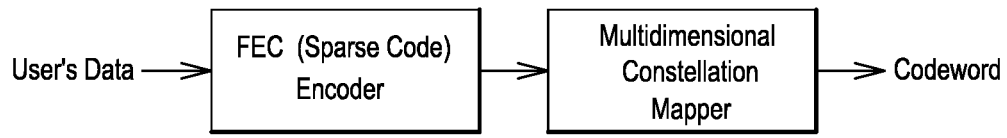
FIG. 2 is a diagram illustrating a known Sparse Code Multiple Access (SCMA) encoder (PRIOR ART)

When considering the known media access method of the SCMA system mentioned above with reference to the Nikopour paper and FIG. 2, the inventors realised that the complexity of the joint multiuser detection used in SCMA quickly grows with the number of users. This essentially inhibits a practical deployment of the proposed technology as operators require scalable solutions.

Low Density Lattice Multiple Access (LDLMA)

The inventors realised that it is possible to provide multi-user medium access, based on multi-dimensional low density lattice codes (LDLC). We refer to this as the low density lattice multiple access (LDLMA)

Low density lattice codes as such are known from the paper by N. Sommer, M. Feder, and O. Shalvi, "Low-density lattice codes," Information Theory, IEEE Transactions on, vol. 54, no. 4, pp. 1561-1585, April 2008.

Figure 3:
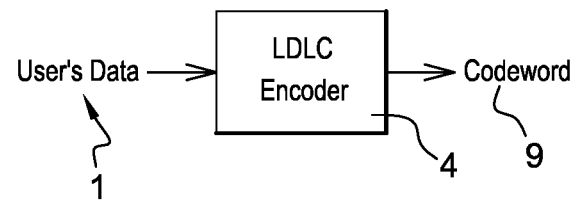
FIG. 3 is a diagram illustrating a Low Density Lattice Multiple Access (LDLMA) encoder according to a first embodiment for comparison with FIG. 2.

As shown in FIGS. 3 and 4, each user terminal (user equipment, UE) 2 includes a respective LDLC encoder 4, and a single LDLC lattice codebook is used for encoding binary data 1 as codewords 9 of all network users.

As shown in FIG. 4, accordingly, a receiver 6 receives a combination 8 of all transmitted codewords 9. Since all users use the same lattice, the received linear combination of multiple codewords 9 is also an element of the lattice codebook used. Thus, the receiver 6 only needs to decode linear combinations 10 of users' LDLC codewords rather than separating them as required by standard joint detection schemes. A single-input-single-output (SISO) LDLC decoder 12 performs this decoding by exploiting the posterior probability of linearly combined codewords in an iterative manner. This results a decoding complexity which is linear even when the number of users is large.

In this approach, the individual codewords of distinct network users are detected by estimating the best combination coefficients 14 subject to the knowledge of channel state information and the received combined codeword.

This approach does not require the receiver 6, for example a base station (BS) 7, to distinguish each user's codeword by using joint-multiuser detection. Instead the receiver 6 estimates the best linear combination of users' codewords then retrieves the individual user's data 16 by solving a set of linear equations for the estimated best coefficients. The base station does not need to separate each user's codeword so a Single-Input Single-Output (SISO) decoder 12 is sufficient.

The encoding and decoding scheme may, of course, be implemented in either or both of uplink and downlink. Especially in the downlink (i.e. towards the user terminal), a SISO decoder may be used (having linear complexity), which reduces the hardware complexity of the mobile handset and saves user terminal battery energy.

The above is an outline. More detail is provided below.

Low Density Lattice Code

An n-dimensional lattice, denoted by $\Lambda$, is a set of points in $R^n$ such that if x, y$\in\Lambda$, then x+y$\in\Lambda$, and if x$\in\Lambda$, then $-$x$\in\Lambda$. A lattice can always be written in terms of a lattice generator matrix $G\in R^{n\times n}$ $$\Lambda = \{x = Gv : v \in Z^n\}.$$

A low-density lattice code (LDLC) is constructed by extending the well-known low-density parity check codes (LDPC); this is done by extending the parity check matrix and syndrome of LDPC from operating over finite field to a real or complex field. An n dimensional LDLC is an n-dimensional lattice code with a non-singular generator matrix G satisfying det$|G|$=1, for which the parity check matrix $H=G^{-1}$ is sparse.

The row or column degree of H is defined as the number of nonzero elements in row or column, respectively. An n-dimensional LDLC is regular if all the row degrees and column degrees of the parity check matrix are equal to a common degree d. An n-dimensional regular LDLC with degree d is called "Latin square LDLC" if every row and column of the parity check matrix has the same nonzero values, except for a possible change of order and random signs. The sorted sequence of these d values is referred to as the generating sequence of the Latin square LDLC.

For example, a parity check matrix of a real LDLC with dimension n=6, row degree 4, column degree 3 and generating sequence $\{1, 0.8, 0.5\}$ is as follows:

$$H = \begin{bmatrix} -0.8 & 0.8 & 0.5 & 0 & 0 & -1 \\ 0 & 0 & 1 & -0.5 & 1 & -0.8 \\ -0.5 & 1 & 0 & -0.8 & 0 & 0.5 \\ 1 & 0 & 0.8 & 0 & 0.5 & 0 \\ 0 & -0.5 & 0 & 1 & 0.8 & 0 \end{bmatrix},$$

Encoding

The encoding scheme is shown in more detail in FIG. 5.

As shown in FIG. 5, encoding in the encoder 4 involves power control 18 by Hypercube shaping, user data encoding 20, and transmission of that data, as described below.

Power Control

In practice, we adopt a power control (i.e. shaping) algorithm so that LDLC codewords meet transmission power constraints. Accordingly, each user terminal 2 uses hypercube shaping, based on a lower triangular parity-check matrix H, to transfer the integer information vector $v_l$ to another integer vector $v'_l$ such that $x'_l = Gv'_l$ satisfies the power constraint.

The hypercube shaping operation is given by $$v'_{l,k} = v_{l,k} - Mr_{l,k},$$

where $r_{l,k}$ is calculated as $$r_{l,k} = \left\lfloor \frac{1}{M}\left(v_{l,k} - \sum_{i=1}^{k-1} H_{k,i} x'_{l,i}\right) \right\rceil$$

Due to the linearity of LDLC, $x'_l = x_l$ mod $\Lambda$ from $v'_l = v_l$ mod M, where M is constellation size.

User Data Encoding

During user data transmission, binary user data are grouped to represent integers, and then mapped onto n-dimensional codewords of the LDLC lattice.

Transmission

Each codeword can be mapped onto distinct OFDM subcarriers or single antenna element of MIMO system.

Reception and Decoding

Figure 6:
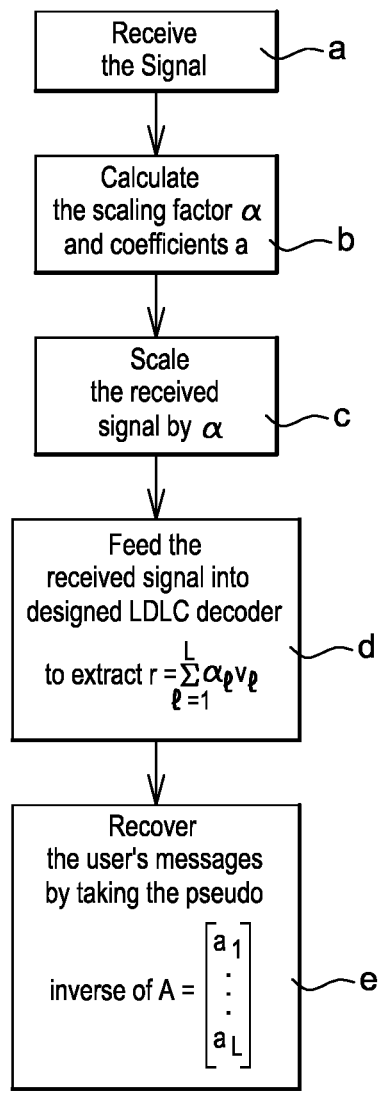
FIG. 6 is a flowchart illustrating in more detail the decoding shown in FIG. 4.

The reception and decoding stages are shown in FIG. 6 and with reference to FIG. 4.

As shown in FIG. 6, reception (step a) is followed by signal processing involving calculating (step b) the scaling factor and coefficients to apply and applying them (step c). The next stage is to one of obtaining (step d) the linear combination of users' messages then recovering (step e) the message of each individual user. These stages are considered below then an illustrative example is provided.

Reception of Superimposed Codeword (Step a)

Suppose the base station (BS) 7 serves L users such that the received signal at the base station is given by $$y = \sum_{l=1}^{L} h_l x_l + z,$$

where $x_l$ is the transmitted lattice codeword with dimension n; $h_l$ is the channel coefficient; and z$\square$CN(0,$\sigma^2 I^n$) is the noise.

Signal Processing (Step b, Step c)

In order to form the linear combination of LDLC codewords, the base station 7 scales the received signal by a factor $\alpha$ and expands the scaled signal as $$\alpha y = \underbrace{\sum_{l=1}^{L} a_l x_l}_{t} + \underbrace{\sum_{l=1}^{L} (\alpha h_l - a_l) x_l + \alpha z}_{z_{\text{eff}}},$$

where t is the linear combination of users' codewords and $z_{\text{eff}}$ is the effective noise.

Since the noise depends on the codeword, the optimal scaling factor $\alpha$ is obtained for this purpose by applying a minimum mean square error (MMSE) criterion such that the variance of the effective noise is minimized, as given by $$\alpha_{opt} = \frac{h^H a P}{\|h\|^2 P + \sigma^2},$$

where P is the power of transmitted codeword; and the coefficient vector $a=[a_1, \ldots, a_L]$ is determined by maximizing the virtual rate of t, given by $$R(h, a) = \max_{a \in \mathbb{Z}^2} \log_2\left(\frac{P}{\|\alpha_{opt}h - a\|^2 P + |\alpha_{opt}|\sigma^2}\right).$$

Substituting $\alpha_{opt}$ into the above equation results in:

$$R(h, a) = \max_{a \in \mathbb{Z}^2} \log_2\left(\frac{P}{aMa^H}\right),$$

where $$M = SNRI_L - \frac{SNR^2 hh^H}{(1 + SNR\|h\|^2)}.$$

Formally, let $M=LL^H$ be the Cholesky decomposition of M, where L is some lower triangular matrix. (The existence of L follows from the fact that M is Hermitian and positive-definite). This gives $aMa^H = \|aL\|^2$. Hence, the above rate optimization is equivalent to solving the following shortest vector problem:

$$a_{opt} = \underset{a \in \mathbb{Z}^2, a \neq 0}{\mathrm{argmin}} \|aL\|^2.$$

Obtaining Linear Combinations of Users' Messages (Step d)

After obtaining $a_{opt}$, the base station 7 decodes the desired linear combination t. In order to successfully recover L user's messages, the base station has to decode the K optimal and independent linear combinations, where K≥L.

To decode the desired t, the proposed LDLMA scheme has to form the following distribution:

$$f_{T_j|\alpha Y}(t_j \mid \alpha y) \propto \sum_l \delta(t_j l_j) \cdot \exp\left(-\frac{d^2(l, \alpha y)}{2\sigma^2(\alpha, a)}\right),$$

where $t_j$ is the j-th component of t; l is the lattice codeword and $l_j$ is the j-th component of it; $d(l,\alpha y)$ denotes the Euclidean distance between $\alpha y$ and l; and $\sigma^2(\alpha, a)$ is the variance of effective noise, given by $$\sigma^2(\alpha, a) = \|\alpha h - a\|^2 P + \alpha \sigma^2.$$

One expands t as follows $$t = \sum_{\ell=1}^{L} a_\ell x_\ell = \sum_{\ell=1}^{L} a_\ell G v_\ell = G \cdot \underbrace{\sum_{\ell=1}^{L} a_\ell v_\ell}_{r},$$

where t itself is a valid codeword of LDLC such that r, which is the linear combination of users' messages, is extracted by passing t through the SISO LDLC decoder 12, given by $\hat{r} = \mathrm{LDLCDecoder}(\alpha y)$, where $\hat{r}$ is the estimated signal. This is described in more detail as follows.

The decoder 12 iteratively estimates $f_{T_j|\alpha Y}(t_j|\alpha y)$ by using Gallager's message passing algorithm over real or complex field. Messages sent by the variable nodes are probability density functions (PDFs) of the dimensional-wise component of t while the messages sent by the check nodes are the periodic extensions of PDFs of dimensional-wise component of t. Each variable node corresponds to a single element of the lattice codeword. Each check node corresponds to a check equation, in other words a row of matrix H.

Let $t_1, \ldots, t_j, \ldots, t_n$ and $c_1, \ldots, c_j, \ldots, c_n$ denote the variable nodes and check nodes respectively. The SISO decoder 12 for the LDLC lattice combination t essentially operates by applying the following method:

Initialization: the variable node $t_1$ sends the message $$f_j^{(0)}(t) = \frac{1}{\sqrt{2\sigma^2(\alpha, a)}} \exp\left(-\frac{|\alpha y_j - t|^2}{2\sigma^2(\alpha, a)}\right)$$

to all neighbouring check nodes.

Basic iteration of check node message: each check node shares a different message with the neighbouring variable nodes. Suppose there are m (equals the row degree of H) variable nodes connected to the check node $c_j$. Those variable nodes are denoted by $t_{j,v}, v \in \{1, \ldots, m\}$ and we have an appropriate check equation $$\sum_{v=1}^{m} \eta_v t_{j,v} \in Z,$$

where Z is the integer set and $\eta_\tau$ is the entry of H. The message that was sent from $t_{j,v}$ to the check node in the previous half-iteration is denoted as $f_v(t), v \in \{1, \ldots, m\}$. The calculation of the message that the check node $c_j$ sends back to the variable node $t_{j,\tau}$ follows the three basic steps:

1) Convolution step: all messages excluding j, (t) are convolved, where $$\frac{t}{\eta_v}$$

will be substituted into $f_v(t), v \in \{1, \ldots, m\}/\{\tau\}$:

$$\tilde{p}_\tau(t) = f_1\left(\frac{t}{\eta_1}\right) * \ldots * f_{\tau-1}\left(\frac{t}{\eta_{\tau-1}}\right) * f_{\tau+1}\left(\frac{t}{\eta_{\tau+1}}\right) * \ldots * f_m\left(\frac{t}{\eta_m}\right)$$

2) Stretching step: $\tilde{p}_\tau(t)$ is stretched by $-\eta_\tau$ to $p_\tau(t) = \tilde{p}_\tau(-\eta_\tau t)$.

3) Periodic extension step: $p_\tau(t)$ is extended to a periodic function with period $$\frac{t}{|\eta_\tau|}$$

given by $$P_\tau(t) = \sum_{i=-\infty}^{\infty} p_\tau\left(t - \frac{i}{\eta_\tau}\right),$$

where $P_\tau(t)$ is the final message that is sent to the variable node $t_{j,\tau}$.

Basic iteration of variable node message: each variable node sends a message to the neighbouring check node.

Suppose there are e (equals to the column degree of H) check nodes connected to the variable node $t_j$, which are denoted by $c_{j,\lambda}$, $\lambda \in \{1, \ldots, e\}$. The message that the check node $c_{j,\lambda}$ sends back to the variable node $t_j$ in the previous half-iteration is denoted by $P_\lambda(t)$. The calculation of the message that is sent from the variable node $t_j$ to the check node $c_{j,\tau}$ follows the two basic steps:

1) The product step:

$$\tilde{f}_\tau(t) = e^{-\frac{(\alpha y_j - t)^2}{2\sigma^2(\alpha,a)}} \prod_{\substack{\lambda=1 \\ \lambda \neq \tau}}^{e} P_\lambda(t).$$

2) the normalization step:

$$f_\tau(t) = \frac{\tilde{f}_\tau(t)}{\int_{-\infty}^{\infty} \tilde{f}_\tau(t) dt}.$$

Repetition: The basic iteration is repeated until the iteration threshold is achieved.

Final Decision: To extract the desired linear combination of users' message, r, the final PDF of the codeword elements $t_1, \ldots, t_j, \ldots, t_n$ should be estimated in the final iteration without excluding any check node message in the product step, given by $$\tilde{f}_{j,final}(t) = e^{-\frac{(\alpha y_j - t)^2}{2\sigma^2(\alpha,a)}} \prod_{\lambda=1}^{e} P_\lambda(t).$$

Then, the estimated codeword element can be obtained from $\hat{t} = \arg\max_t \tilde{f}_{j,final}(t)$. At last, the desired r is calculated as $\hat{r} = \lfloor H \cdot \hat{t} \rfloor$.

Message Recovery (Step e)

Given the channel state information, the base station 7 obtains the best K linear combination $\hat{r}$'s, indexed as $[\hat{r}_1, \ldots, \hat{r}_K]$, namely, at least as many optimal independent linear combinations are obtained as the number of transmitters. The coefficients of these linear combinations form a matrix $$A = \begin{bmatrix} a_1 \\ \vdots \\ a_K \end{bmatrix}.$$

In order to successfully recover the users' messages $[v_1, \ldots, v_L]$, the rank of A should be no less than L. As such, the base station takes the pseudo inverse to recover $[v_1, \ldots, v_L]$, given by $$\begin{bmatrix} \hat{v}_1 \\ \vdots \\ \hat{v}_L \end{bmatrix} = (A^T A)^{-1} A^T \cdot \begin{bmatrix} \hat{r}_1 \\ \vdots \\ \hat{r}_K \end{bmatrix}.$$

Example

Here is a simple example to illustrate the decoding procedure of LDLMA: there are 2 user terminals with access to the base stations. Both user terminals employ the same LDLC codebook $\Lambda$, where the codewords are $x_1 = Gv_1$ and $x_2 = Gv_2$, respectively. Assume that the channel coefficient vector is $h = [h_1 \ h_2]^T = [1 \ 2.2]^T$ such that the received signal is $y = 1x_1 + 2.2x_2 + z$. Assuming after the rate optimization, the base station selects, say, $\alpha_1 = 5$ and $\alpha_2 = 4$ as the best two scale factors such that we have $$5y = \underbrace{5x_1 + 11x_2}_{t_1} + 5z,$$

and $$4y = 4x_1 + 8.8x_2 + 4z$$
$$= \underbrace{4x_1 + 9x_2}_{t_2} + \underbrace{(-0.2x_2 + 4z)}_{z_{eff,2}}.$$

where $$A = \begin{bmatrix} 5 & 11 \\ 4 & 9 \end{bmatrix}$$

as $t_1, t_2 \in \Lambda$, the SISO lattice decoder over $\Lambda$ iteratively estimates the distributions $f_{T_1|Y}(t_1|y)$ and $f_{T_2|Y}(t_2|y)$ to extract $r_1 = 5v_1 + 11v_2$ and $r_2 = 4v_1 + 9v_2$ because of the following equalities: $5x_1 + 11x_2 = G(5v_1 + 11v_2)$ and $4x_1 + 9x_2 = G(4v_1 + 9v_2)$. Once we have $r_1$, $r_2$ and A, we obtain the users' data $v_1$ and $v_2$ by taking the inverse of A over $r_1$ and $r_2$.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of receiving user data from multiple transmitters, the user data from each transmitter having been encoded as a Low Density Lattice codeword, and multiple Low Density Lattice codewords having been transmitted so as to be received as a combined signal at a receiver, the method of receiving comprising:
- (i) receiving the combined signal,
- (ii) calculating coefficients of linear combinations of the Low Density Lattice codewords from the multiple transmitters,
- (iii) calculating a scaling factor to be applied to the combined signal based on the coefficients,
- (iv) scaling the combined signal with the scaling factor to provide a linear combination of the Low Density Lattice codewords,
- (v) decoding the linear combination of the Low Density Lattice codewords based on channel state information to obtain an optimal independent linear combination of user data,
- (vi) repeating the calculating coefficients, calculating a scaling factor, scaling and decoding to obtain at least as many optimal independent linear combinations as the number of transmitters, and recovering the user data from the optimal independent linear combinations;

wherein the calculation of the scaling factor comprises applying a minimum mean square error (MMSE) criterion to minimize variance of effective noise by determining the scaling factor according to a coefficient vector determined by maximizing a virtual rate of the linear combinations of the Low Density Lattice codewords.

2. The method according to claim 1, in which the decoding linear combinations comprises iterative cycles, each cycle comprising calculating a variable node message and calculating a check node message.

3. The method according to claim 2, in which obtaining each optimal independent linear combination comprises, after the final iteration, estimating probability density functions of codeword elements.

4. The method according to claim 1, in which the linear combination of codewords is itself a valid codeword of the Low Density Lattice.

5. The method according to claim 1, in which the recovering user data from the optimal independent linear combinations comprises taking a pseudo-inverse of a matrix of coefficients of the optimal independent linear combinations.

6. The method according to claim 1, in which the transmitters are user terminals for cellular wireless telecommunications.

7. A receiver configured to receive user data from multiple transmitters, the user data from each transmitter being encoded as a Low Density Lattice codeword, and multiple Low Density Lattice codewords transmitted so as to be received as a combined signal at the receiver, the receiver comprising:
- a receiving stage configured to receive the combined signal;
- an iterative processing stage configured to provide at least as many optimal independent linear combinations as a number of transmitters, the iterative processing stage comprising:
- a processor configured to calculate coefficients of linear combinations of the Low Density Lattice codewords from the multiple transmitters,
- a processor configured to calculate a scaling factor to be applied to the combined signal based on the coefficients, wherein the calculation of the scaling factor comprises applying a minimum mean square error (MMSE) criterion to minimize variance of effective noise by determining the scaling factor according to a coefficient vector determined by maximizing a virtual rate of the linear combinations of the Low Density Lattice codewords,
- a processor configured to scale the combined signal with the scaling factor to provide a linear combination of the Low Density Lattice codewords, and
- a decoder configured to estimate an optimal linear combination of user data based on channel state information and the linear combination of the Low Density Lattice codewords; and
- wherein the receiver also comprises a recovery stage configured to recover the user data from the optimal independent linear combinations.

8. The receiver according to claim 7, which is a base station for cellular wireless communications.

9. The receiver according to claim 7, in which the decoder is a Single-Input Single-Output, SISO, decoder.

10. A method of transmitting user data as codewords of a Low Density Lattice, the method comprising:
- adapting codewords of a shared Low Density Lattice codebook by hypercube shaping for power control;
- encoding by respective transmitters of a plurality of transmitters respective user data into a respective codeword of the Low Density Lattice codebook for transmissions; and
- transmitting by the respective transmitters the respective codewords on a carrier signal over air;
- wherein the plurality of transmitters use the shared Low Density Lattice codebook; whereby coefficients of linear combinations of the Low Density Lattice codewords from the multiple plurality of transmitters can be calculated, and whereby a scaling factor to be applied to a combined signal from the plurality of transmitters can be calculated based on the coefficients, wherein the calculation of the scaling factor comprises applying a minimum mean square error (MMSE) criterion to minimize variance of effective noise by determining the scaling factor according to a coefficient vector determined by maximizing a virtual rate of the linear combinations of the Low Density Lattice codewords.

11. The method of transmitting according to claim 10, in which the transmitters are user terminals for wireless cellular telecommunications.

12. A respective transmitter, the respective transmitter comprising:
- at least one processor;
- at least one memory including computer program code, the at least one memory and computer program code configured to, with the at least one processor, cause the respective transmitter to at least transmit towards a receiver respective data as codewords of a Low Density Lattice codebook comprising a set of codewords for encoding, the codebook being shared with other transmitters of an associated plurality of transmitters, wherein the respective transmitter encodes its respective data into a respective codeword for transmission and transmits the codeword via a carrier signal over air;
- wherein the plurality of the transmitters use the shared Low Density Lattice codebook, whereby coefficients of linear combinations of the Low Density Lattice codewords from the multiple transmitters can be calculated, and whereby a scaling factor to be applied to a combined signal from the plurality of transmitters can be calculated based on the coefficients, wherein the calculation of the scaling factor comprises applying a minimum mean square error (MMSE) criterion to minimize variance of effective noise by determining the scaling factor according to a coefficient vector determined by maximizing a virtual rate of the linear combinations of the Low Density Lattice codewords, and the codewords of the Low Density Lattice are adapted by hypercube shaping for power control.

13. The method according to claim 1, wherein the maximization of the virtual rate of the linear combinations of the Low Density Lattice codewords includes solving a maxlog function, wherein a power of the Low Density Lattice codewords is an input to the maxlog function.

14. The method according to claim 10, wherein the hypercube shaping is based on a lower triangular parity-check matrix, and transfers one integer information vector to another integer vector such that a power constraint is satisfied.

15. A receiver configured to receive user data from multiple transmitters, the at the receiver, the receiver comprising:
a receiving stage configured to receive user data from each transmitter of the multiple transmitters encoded as a low density lattice codeword, multiple low density lattice codewords of the multiple transmitters being transmitted so as to be received as a combined signal;
at least one processor; and
at least one memory including computer program code, the at least one memory and the computer program code configured to, with the at least one processor cause the receiver to iteratively:
calculate coefficients of linear combinations of low density lattice codewords from the multiple transmitters,
calculate a scaling factor to be applied to the combined signal based on the coefficients, wherein the calculation of the scaling factor comprises applying a minimum mean square error (MMSE) criterion to minimize variance of effective noise by determining the scaling factor according to a coefficient vector determined by maximizing a virtual rate of the linear combinations of the low density lattice codewords,
scale the combined signal with the scaling factor to provide a linear combination of the low density lattice codewords; and
estimate an optimal linear combination of user data based on channel state information and the linear combination of the low density lattice codewords;
wherein the receiver also comprises a recovery stage configured to recover the user data from the optimal independent linear combinations.

* * * * *